United States Patent [19]

Weiman et al.

[11] Patent Number: 5,103,306
[45] Date of Patent: Apr. 7, 1992

[54] DIGITAL IMAGE COMPRESSION EMPLOYING A RESOLUTION GRADIENT

[75] Inventors: Carl F. R. Weiman, Westpoint; John M. Evans, Jr., Brookfield, both of Conn.

[73] Assignee: Transitions Research Corporation, Dansbury, Conn.

[21] Appl. No.: 500,735

[22] Filed: Mar. 28, 1990

[51] Int. Cl.$^5$ .............................................. H04N 7/13
[52] U.S. Cl. ................................... 358/133; 358/209
[58] Field of Search ............... 358/133, 108, 103, 125, 358/205

[56] References Cited

U.S. PATENT DOCUMENTS

| 4,028,725 | 6/1977 | Lewis | 358/109 |
| 4,405,943 | 9/1983 | Kanaly | 358/103 |
| 4,513,317 | 4/1985 | Ruoff, Jr. | 358/109 |
| 4,523,230 | 6/1985 | Carlson et al. | 358/167 |
| 4,554,585 | 11/1985 | Carlson | 358/225 |
| 4,692,806 | 9/1987 | Anderson et al. | 358/209 |

OTHER PUBLICATIONS

"Exponential Sensor Array Geomegry and Simulation", a reprint from the Proceedings of SPIE-The International Society for Optical Engineering, vol. 938, 4–6 Apr. 1988, Orlando, Fla. by C.F.R. Weiman.
"Robot Vehicle Video Image Compression", Phase II SBIR Final Report, Contact No. DAAE07-C-R068 Jan. 1989.
"Report Number Assignment, Comments, and Approvals of Technical Report, In–House and Contract)".
"The Laplacian Pyramid as a Compact Image Code", IEEE Transactions on Communications, vol. Com-31, No. 4, Apr. 1983, pp. 532–540.
"3-D Sensing with Polar Exponential Sensor Array", Digital and Optical Shape Presentation and Pattern Recognition (Orlando, Apr. 4–8, 1988) Carl Weiman.

Primary Examiner—Victor R. Kostak
Attorney, Agent, or Firm—Perman & Green

[57] ABSTRACT

Video image compression apparatus and method provides full color, wide field of view, real time imagery having high central resolution. Compression ratios of 1600:1 are achieved thus reducing a required data transmission bandwidth sufficiently to abolish line-of-sight restrictions. Data compression apparatus and method (a) uses a log polar mapper to match the image display to human perceptual resolution to achieve a 25:1 compression ratio with no loss of perceived cues, (b) separates perceptual channels into low resolution, high discrimination level color and high resolution, low discrimination level contrast edges to yield an additional 8:1 compression ratio and (c) applies a data compression technique to yield an additional 8:1 compression ratio. A Gaussian filter is employed in generating a display of the imagery from the compressed data. An operator is provided a capability to rapidly move the high resolution window to any point of interest within the display.

34 Claims, 7 Drawing Sheets

Geometry of Gaussian Interpolation

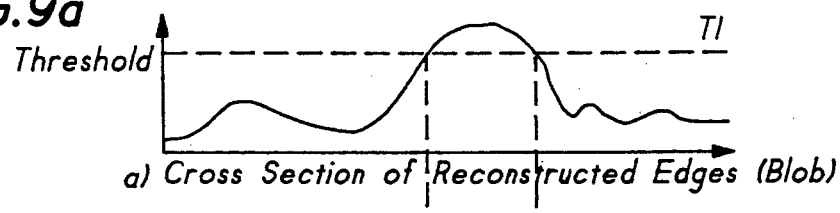
a) Cross Section of Reconstructed Edges (Blob)
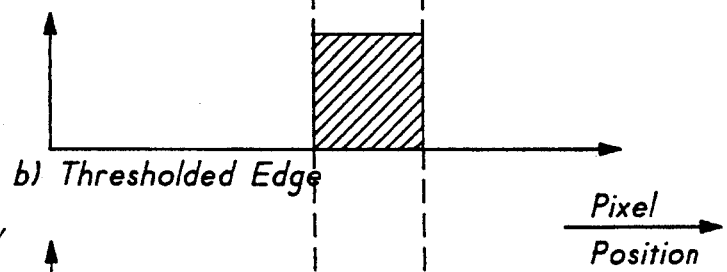
b) Thresholded Edge
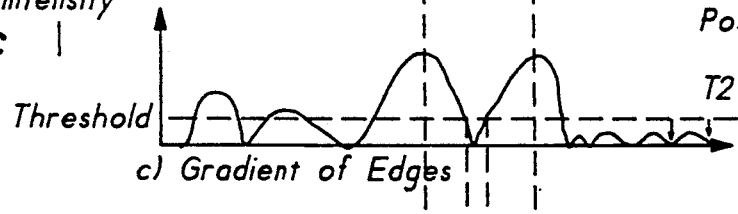
c) Gradient of Edges
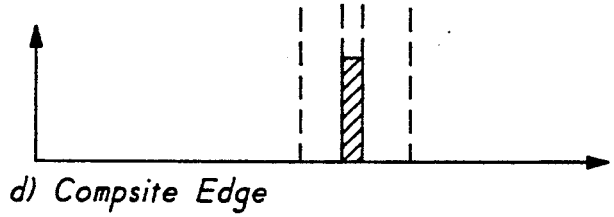
d) Compsite Edge
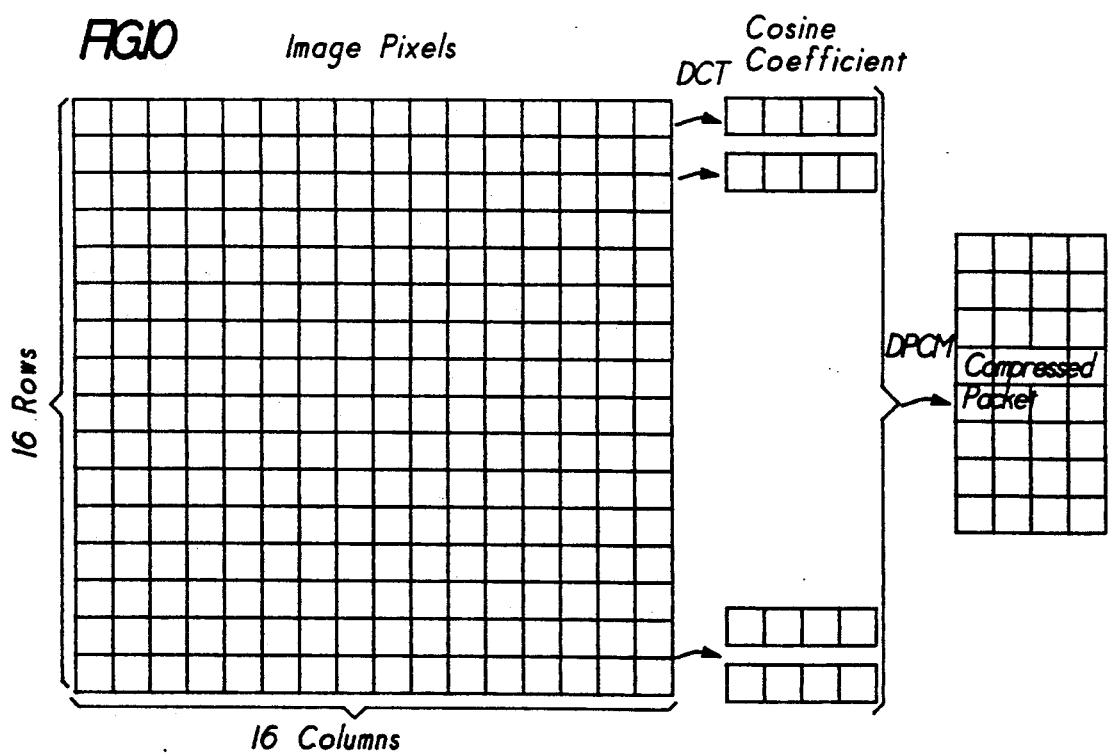

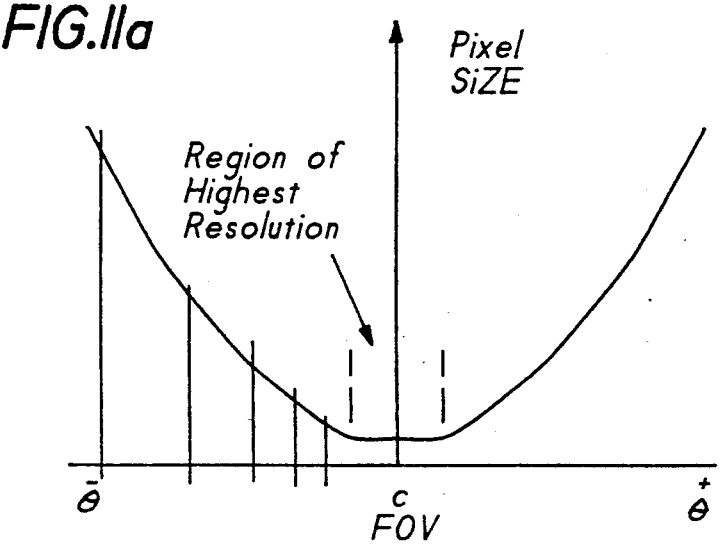
FIG.IIa
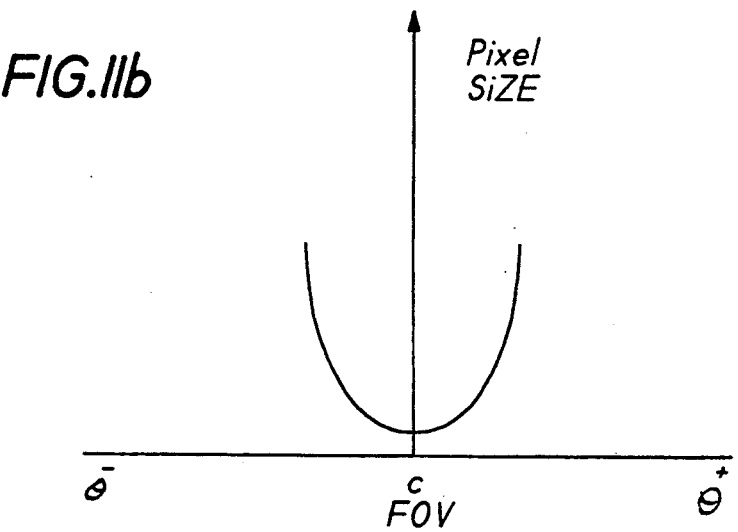
FIG.IIb
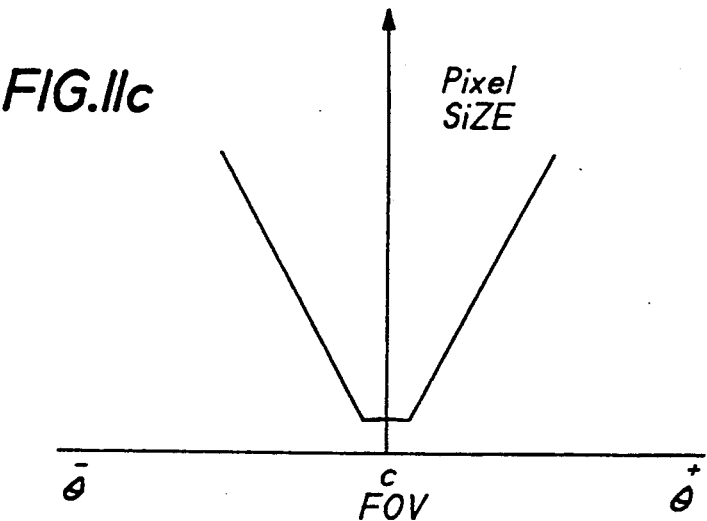
FIG.IIc

DIGITAL IMAGE COMPRESSION EMPLOYING A RESOLUTION GRADIENT

FIELD OF THE INVENTION

This invention relates generally to image transmission systems and, in particular, to image transmission systems which relay imagery to a viewer at some distance from the source of the image such that the image is received in a timely fashion, in a form which is readily comprehensible, and in an efficient manner requiring a limited communications bandwidth.

BACKGROUND OF THE INVENTION

Remote operations, such as the handling of radioactive materials or driving unmanned vehicles, require rapid visual feedback to a human operator. For some applications, such as micromanipulation in surgery or conducting repairs or inspections in spaces inaccessible to humans, optical devices such as microscopes, telescopes, or optic fiber bundles can be used to direct imagery to the operator.

However, over long distances optical devices are not practical in presenting imagery to the operator in that light losses become too large or image focus cannot be maintained. It is common in these cases to encode an image into a signal whose elements represent small components of the image and to subsequently reconstruct the image at the destination. Video is one example. An analog signal is constructed electronically from the light intensity at tiny spots in a pickup camera. The signal is decoded at the receiver, where light intensity is reconstructed at corresponding spots in a display.

Because there are so many spots of light to encode and transmit to obtain a reasonable degree of image resolution a bandwidth for video imagery is very high. In applications where the image pickup device is fixed, and the operator has control of the space between image pickup and operator, dedicated coaxial transmission lines can be used to transmit imagery. When the remote image pickup is mobile, however, the transmission lines must be flexible and tethered between the remote and the operator site. Alternatively, electromagnetic (radio) waves can be used as a carrier. The high bandwidths of video imagery typically requires microwave transmission, which restricts the relative position between remote image pickup and the receiver to line-of-sight transmission. However, line-of-sight transmission may be a serious restriction. Within buildings, transmission around corners or through walls is impossible. In military unmanned vehicles, the transmitter is required to operate from exposed positions on crestlines of hills.

It is therefore an object of the invention to provide visual data encoding which reduces an amount of data required to represent an image, and to subsequently decode the compressed imagery into a form which is recognizably perceived by the human viewer.

It is a further object of the invention to compress the image data by matching the parameters of the encoded information to the parameters of human visual perception, and to provide a decoding technique which faithfully reproduces the parameters in a displayed image.

It is another object of the invention to encode image information in such a manner that the center of the field of view is represented at high resolution, with peripheral resolution being progressively coarser in proportion to distance from the center.

It is another object of the invention to encode realtime (30 images per second), wide field of view, color imagery with high central resolution and lower peripheral resolution, and in such a manner that the encoded imagery can be transmitted by RF waves through air or vacuum without line-of-sight restrictions.

SUMMARY OF THE INVENTION

The foregoing and other problems are overcome and the objects of the invention are realized by an image encoding and decoding apparatus constructed and operated in accordance with the invention.

The encoding apparatus geometrically decomposes the image into small regions or pixels whose resolution is highest at the center of the field of view, and becomes progressively coarser at successively more distant locations from the center of the field of view. This advantageously reduces the number of pixels over conventional equal-resolution encoding by a factor of approximately 25:1.

The decoding apparatus reconstructs the image by constructing a full field of view display, with successively larger regions towards the periphery of the field of view. The regions are blended by interpolation to provide a display which fills the field of view without introducing artifactual boundaries between regions.

That is, the invention teaches the encoding of an image by resolution gradient and decoding by interpolation. Further refinements which separately encode human color and contrast channels, and which apply standard data compression techniques, yield still higher compression ratios. In the following description, the resolution gradient encoding described above is referred to as "stage 1" of the compression process, contrast and color encoding are referred to as "stage 2" and data compression as "stage 3".

A refinement of the invention, with greater data compression, is achieved by further encoding the reduced resolution image to separate color data from contrast data. Color data is perceived by humans at coarser resolution than contrast data. Hence color may be encoded with fewer pixels. Contrast data is well perceived by humans without depicting shading variations along a contrast boundary, for example the uniform black line which outlines colored regions in cartoons. Hence contrast data is represented with far fewer bits per pixel than color. The compression rate available by so compressing color and contrast is approximately 8:1 compared to raw digital video imagery.

Another aspect of the invention which further compresses data is the application of well known data compression algorithms, such as the discrete cosine transform and differential pulse code modulation. This technique provides a further 8:1 compression ratio.

The three stages described above yield a total of approximately 1600:1 data compression over conventional digital imagery. The net data rate to transmit the compressed imagery is approximately 70,000 bits per second for wide field of view color imagery at 30 frames per second. Imagery is sufficiently rich and current to permit remote driving applications, and data rates are sufficiently low to relax line-of-sight restrictions for radio frequency (RF) transmission.

Other applications may not require full color, 30 frame per second update, or high central resolution. For example, security surveillance may require but a few frames per second of black and white imagery. In such cases, significantly lower data rates result, requiring even less bandwidth. The decreased hardware requirements for such cases makes them cost effective in applications which cannot economically support a full color system. In all cases however, reconstruction of imagery inverts the operations of each of the compression stages to generate a display whose image point positions faithfully correspond to the same positions in the original image, within the limits of the resolution of the display.

BRIEF DESCRIPTION OF THE DRAWING

The above set forth and other features of the invention are made more apparent in the ensuing Detailed Description of the Invention when read in conjunction with the attached Drawing, wherein:

FIG. 8b illustrates the integral of the one dimensional Gaussian of FIG. 8a;

FIGS. 9a-9d show steps of a method of sharpening image edges reconstructed from the logarithmic domain;

FIG. 10 illustrates a 16×16 image pixel domain and a compressed packet produced therefrom by hybrid DCT/DPCM data compression; and FIG. 11a-11c graphically depict various possible image resolution variations as a function of pixel size and distance from the center of the field of view.

DETAILED DESCRIPTION OF PREFERRED EMBODIMENTS OF THE INVENTION

One preferred embodiment of the invention is described below in the context of an application for remotely driving a vehicle with visual feedback provided to a driver/operator. Applications other than the guidance of remote vehicles using visual feedback include but are not limited to remote manipulation in situations where communications bandwidths are limited, surveillance, and exploration in space and undersea.

Observation of remote driving recordings and analysis of human vision suggests that much wider fields of view than provided by a single conventional camera greatly improve operator perception of a three dimensional environment. A short vertical field of view prevents the simultaneous visual reference of horizon and immediate path. A narrow field of view deprives the operator of critical inputs such as a panorama of the horizon for orientation, a view of the road ahead when it curves, a view of immediate alternative paths of opportunity when an obstacle lies directly ahead, peripheral warning threats, and medium to long range terrain assessment for path planning.

However, conventional wide field of view lenses suffer from severe vignetting, or a decrease of light-gathering power peripherally, and also from radial or fisheye distortion. Although these deficiencies may be partially compensated for by lookup tables, the fixed resolution of CCD and other imaging devices inherently yields reduced data resolution per solid angle as the field of view is increased. In accordance with an aspect of the invention a multiple camera system provides a solution to these problems and the invention is described in the context of such a multiple camera system. It should be realized though that the invention is not to be construed to be limited for use with any specific number of cameras, or to be limited to any specific type of camera such as a CCD device or a vidicon device. By example, for a department store surveillance application a single black and white camera operating a four frames per second and mounted to an autonomous or remotely controlled vehicle may be adequate.

Figure 1A:
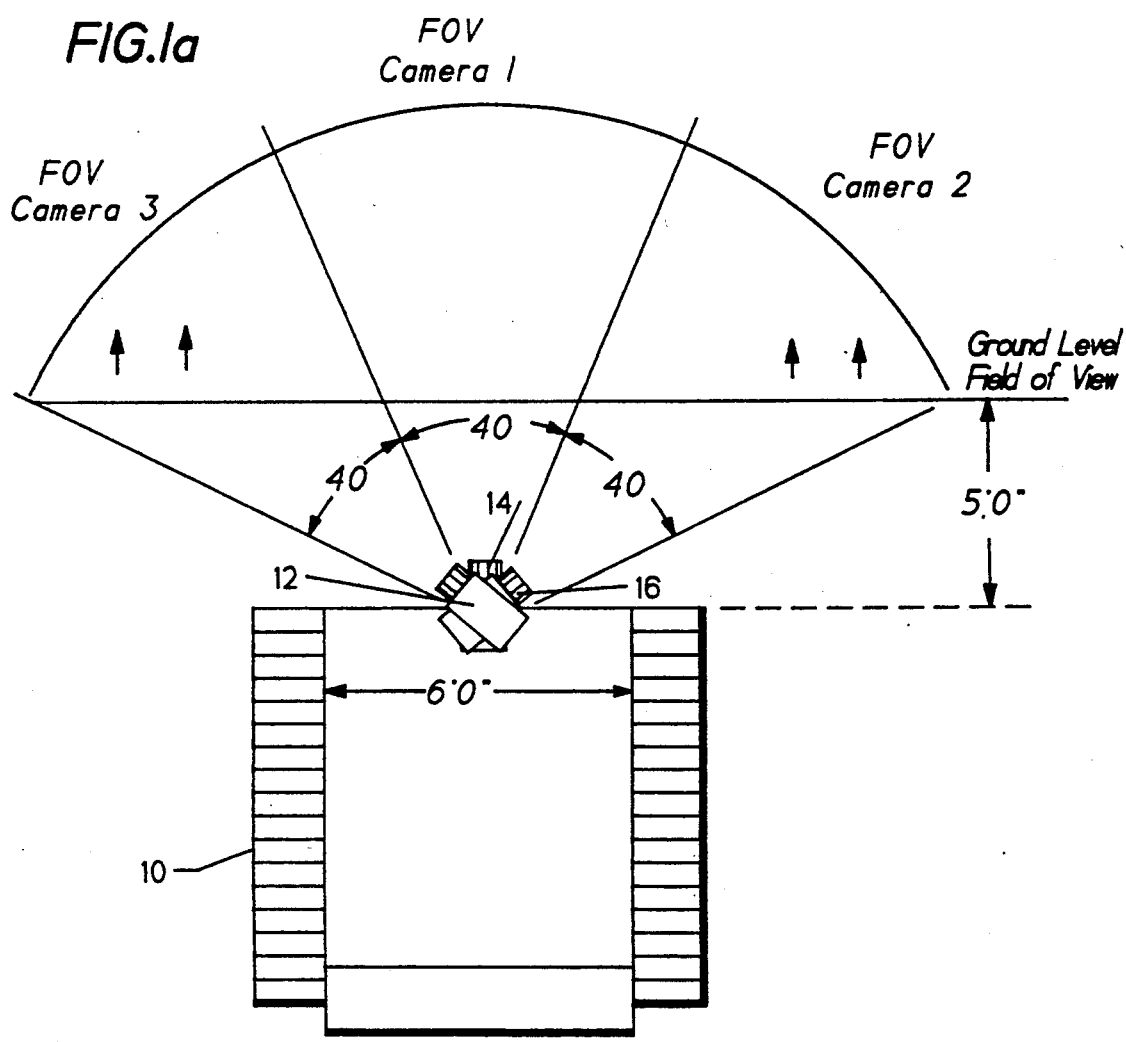
FIG. 1a is a top view of a remotely controlled vehicle having cameras and illustrating fields of view of the cameras being abutted to provide an operator display panorama.
Figure 1B:
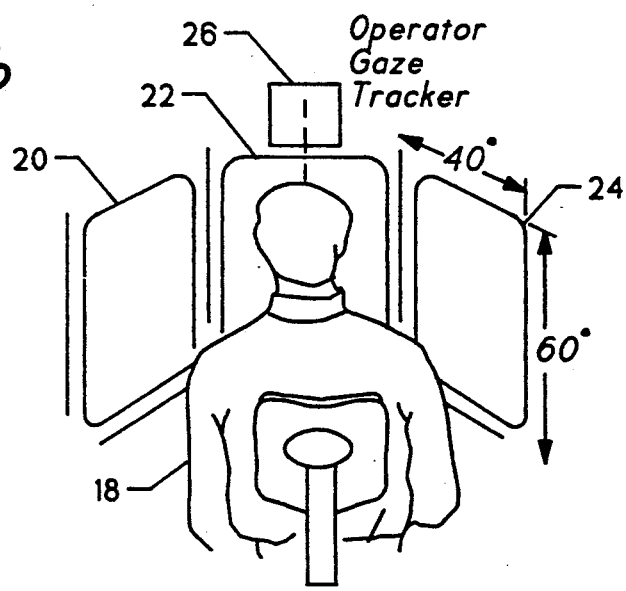
FIG. 1b illustrates display screens providing an operator display panorama resulting from the transmission of the camera-generated image data.

FIG. 1a illustrates a top view of a remote vehicle (RV) 10 having a field of view 120 degrees wide and 60 degrees high, provided by three CCD cameras (12, 14, 16) each provided with a standard eight millimeter lens. The fields of view (FOV) of each of the cameras are abutted to provide a remotely positioned operator 18 the display panorama illustrated in FIG. 1b. The cameras 12, 14 and 16 are preferably rotated by 90 degrees so that scan lines are vertical. This technique is known to be used in some computer displays and video games where large vertical fields of view are desired.

A field of view 120 degrees in width has been found to cover a significant portion of human peripheral vision. A 60° vertical field of view has also been found to provide frontal coverage from approximately five feet in front of the vehicle 10 to above the horizon. Near range coverage is based on the cameras 12, 14 and 16 being mounted three feet above the ground and pointed at the horizon. Viewfield width on the ground is approximately 17 feet, providing for local obstacle and terrain perception.

Three color video displays 20, 22 and 24 are arranged to subtend to the operator 18 the same visual angle as viewed by the cameras 12, 14 and 16. Thus, 17 inch displays may be viewed from 12 inches. Such ranges are much too close for effectively viewing standard video monitors. However, optical elements may provide the same field of view without close focus. For example, visual flight simulators are known to use "infinity optics" in the form of concave mirrors to achieve a wide field of view without close focus. A planar holographic lens, or helmet mounted displays may also be employed. Alternatively, HDTV (high definition television) monitors may be employed for close viewing.

Figure 4:
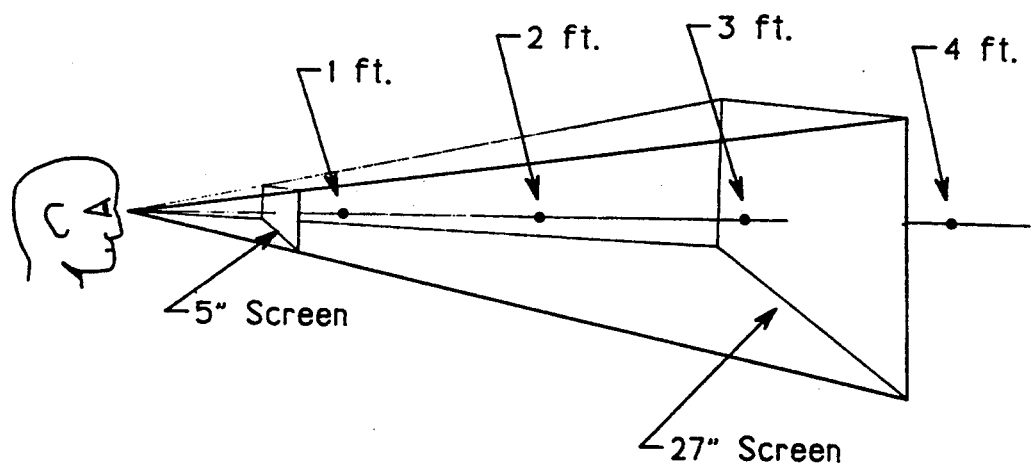
FIG. 4 illustrates a relationship between screen size and viewing distance.

FIG. 4 illustrates, by example, a relationship between screen size and viewing distance to match camera and operator field of view for a 16 mm lens, which subtends a field of view width of 30 degrees. This results in the placement of a five inch display at just under eight inches from the viewer, a 13 inch display at 20 inches, and a 21 inch display at 31 inches. One image pixel in a pixel line subtends 0.05 degrees or 3.5 minutes of arc, adequate for maximum acuity display.

Figure 2:
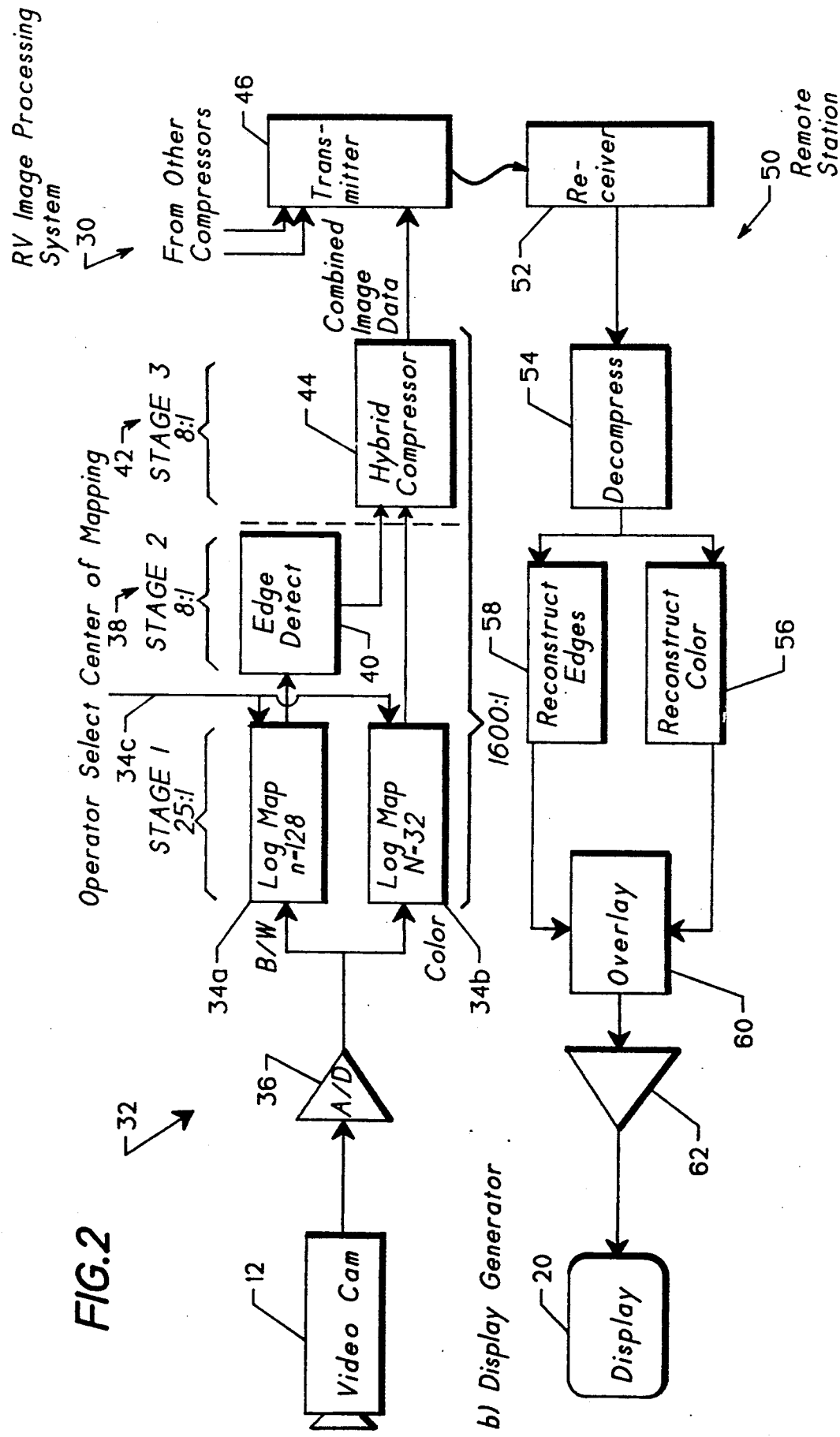
FIG. 2 illustrates data flow through a presently preferred apparatus for implementing the teaching of the invention.

FIG. 2 illustrates data flow through a presently preferred image processing system 30 wherein a processing sequence performed upstream of image data transmission includes video image remapping to reduce pixel count, coding of color and contrast edges, followed by data compression. It should be realized during the ensuing discussion that each of the three cameras 12, 14 and 16 may be provided with associated data compression apparatus including an A/D, log mappers, edge detector and hybrid compressor or, the outputs of the three cameras may be time multiplexed to share one set of data compression apparatus.

In a first stage 32 of data compression video data generated by a camera is resampled via logarithmic mapping tables 34a and 34b to reduce the image pixel count. Tables 34a and 34b effect a resampling geometry which is a rotationally symmetric pattern having cells that increase in size and hence decrease in resolution continuously with distance from the center of the image. The result is known as conformal logarithmic or logarithmic (log) polar mapping. The logarithmic mapping sampling pattern is spread panoramically across the view fields of all three of the cameras 12, 14 and 16. The position of the image center, having the highest resolution, is selected by the operator as described below.

It should be realized that the cameras 12, 14 and 16 may generate the log polar output directly, thereby eliminating the requirement for the logarithmic mapping tables 34a and 34b. For example, G. M. Chaikin and C. F. R. Weiman describe in U.S. Pat. No. 4,267,573, issued May 12, 1981 and entitled "Image Processing System", embodiments of imaging devices having imaging cells arranged in various configurations.

Figure 5:
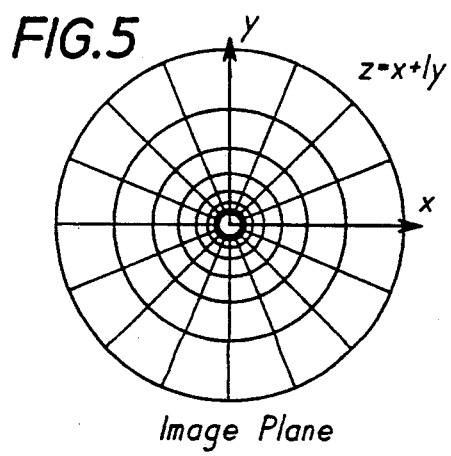
FIG. 5 illustrates conformal logarithmic mapping (LOG(z)) and specifically transformed reduced data and a storage array for same, the storage array having rows and columns corresponding to rays and rings of the rotationally symmetric sampling pattern of cells.

In greater detail the first stage 32 digitizes the output of a camera with an analog-to-digital (A/D) converter 36 and splits the digitized video into two parallel paths, one for black and white, and the other for color at lower resolution. As depicted in FIG. 5 black-and-white imagery is mapped by Log Mapper 34a using a pattern with 128 radial wedges of pixels. An inner ring of the 128 wedge pattern is forty video lines in diameter for a 480-by-512 pixel camera video sensor array. Within this ring, original video is preserved at normal image resolution. This inner ring is predetermined to have a diameter that is roughly double the diameter of the human fovea, the central region of uniform high resolution in human vision. Each video line subtends less than 6 arcminutes, the diameter of human receptive fields in the fovea. As is known, human receptive fields double in size for each doubling in radius outside the fovea. The increase in size of resampling cells in the 128 wedge pattern provided by Log Mapper 34a matches this human resolution gradient. Each light receptive region in FIG. 5 can be seen to be bounded by rings and rays although other geometries are possible such as hexagonal or triangular tesselations.

FIGS. 11a–11c possible sensor configurations all showing that the pixel size increases and the image resolution decreases continuously and becomes progressively coarser as one moves away from the center (C) and towards the periphery of the FOV.

The digitized color image data is resampled and mapped by Log Mapper 34b using a pattern with 32 radial wedges of pixels. This represents a 4×4 subsampling of black and white contrast data, which corresponds closely to the ratio of color vision resolution to brightness contrast resolution in human vision, as described below.

The second stage 38 of data compression for black and white imagery operates to apply an edge detection filter 40 to the log mapped brightness data. The result is a map of local high contrast intensities. Color processing includes, in the log mapper 34b, an averaging of all color values within a resampling cell.

By example, if eight bit data is output from the A/D 36 the Log Mapper 34a achieves a 25:1 reduction in pixel count. The gray scale remapped pixel output is applied to Edge Detector 38 where each remapped pixel eight bit gray scale value is reduced to but a single bit for indicating the presence or the absence of a feature edge, thereby achieving a further 8:1 compression. The color Log Mapper 34b reduces the number of pixels while maintaining the same number of bits of resolution per pixel.

The third stage 42 of data compression includes a hybrid data compression block 44. Edge contrast and color data are blocked into 16×16 element data arrays by the compression block 44. Each row of 16 elements is discrete cosine transformed and the resulting coefficients are DPCM (differential pulse code modulation) encoded. The output digital data stream is applied to a transmitter 46 and is transmitted from the RV 10. A suitable transmission rate is 70 kilobits/sec.

The signal transmitted by the RV 10 is received at a remote station 50 by a receiver 52 and is reproduced as a digital data stream. The DPCM and Discrete Cosine Transformation steps are inverted by a Decompression block 54, yielding a logarithmic mapped image. Color data is exponentially mapped into a display buffer using a color reconstruction block 56 that employs Gaussian interpolation or bicubic interpolation. Edge contrast data is reconstructed by an edge reconstruction block 58. Block 58 employs inverse logarithmic mapping. The B/W edge contrast data is sharpened using image processing techniques such as thinning and thresholding. Edge data is superimposed on color data by overlaying black edge data on the color data in block 60, yielding a cartoon-like quality image. More subtle image overlays are achieved by inverting or by brightening underlying color imagery where contrast edges occur. The overlayed image data is applied to a Digital-to-Analog (D/A) converter 62 and is applied to the associated display 20 for viewing by the operator 18.

These various elements of the invention are now described in greater detail.

It has been found that the perceptual match between displayed data and the distribution of human visual resolution is valid only if the operator 18 is looking directly at the center of the mapping, in that off-center viewing results in a grossly blurred image. However, the restriction of a fixed viewing center is unacceptable for RV applications in that humans constantly move their eyes around in a visual field to bring points of interest into high resolution. Therefore, the ability to move the center of the logarithmic mapping around within the image to focus on points of interest is an important aspect of the utility of the system 30 of the invention.

In the teleoperator environment, there is information flowing in both directions; visual data from the vehicle 10 and control data from the operator 18. In accordance with an aspect of the invention certain of the commands sent from the operator 18 are commands from the operator 18 to change the center of mapping in the vehicle video processor to coincide with the operator's point of gaze on a particular one of the display screens 20, 22 or 24.

One implementation of this aspect of the invention employs an operator focus or gaze tracker 26 such as an eye tracker which is disposed in the operator station to measure the direction of gaze of the operator. One suitable type of eye tracker is manufactured by ISCAN of Boston, Mass. A presently preferred embodiment of an operator gaze tracker 26 is provided by a head tracker in that a head tracker is typically mechanically simpler and more readily implemented than an eye tracker. One suitable design is based on an operator worn, helmet-mounted LED (light emitting diode) that aims at a wide field of view black-and-white CCD video camera. The CCD video camera detects the light from the LED, the position of the light within the CCD field of view being a function of the position of the operator's head and also, preferably, the operator's gaze direction. The CCD detected position information is transmitted to the RV 10 and employed thereby in a manner described below to move the high resolution portion of the image in synchronism with movement of the operator's gaze about the displayed image. Screen coordinates of the gaze direction, for example nine bits for each x and y screen coordinate, are determined and transmitted to the RV 10. At the RV 10 the screen coordinate data is treated as an offset that is added to the nominal center of screen coordinates to serve as a new center for the logarithmic mapping. This operation is relatively straight forward and may be carried out at typical frame rates without changing lookup tables. The operator 1B thus perceives the RV 10 environmental scene at full resolution at all times, wherever he is looking. This input 34c from the operator 18 is shown being applied to both of the Log Map Look-up Tables 34a and 34b and provides thereto an address offset which is a function of the operator's gaze relative to the display screen.

Although a manually activated mouse or joystick may also provide adequate control of focus of attention, the operator's hands and feet may be occupied with driving the remote vehicle 10. For an embodiment that employs a camera that provides a log polar output directly the operator gaze direction signal can be employed to train the camera aperture in a direction that coincides with the operator's gaze direction.

Figure 3:
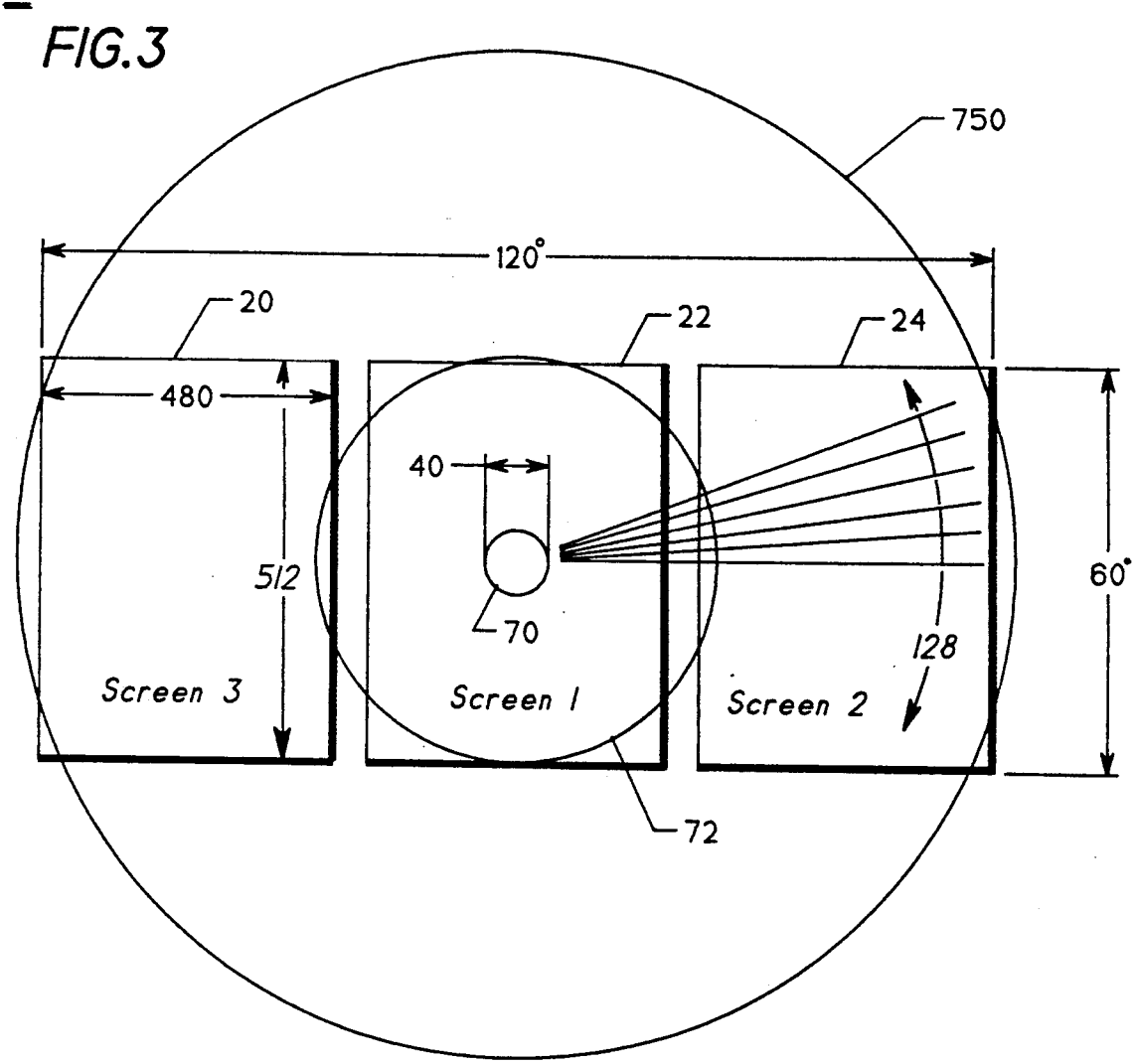
FIG. 3 illustrates image resampling geometry superimposed on the operator display screens and showing the image region of highest resolution centered on the central screen.

FIG. 3 depicts the three display screens 20, 22 and 24 of video data overlaid with appropriate resampling ring radii. By example, input video data is 480×512, or 245,760 pixels. The uniform, normal resolution central disk 70 resulting from the mapping is shown centered on screen 22, with the understanding that it may be moved freely among the three screens. Wherever the disk 70 moves mapping domains in the panoramically adjacent screens are concentric with the disk 70 and consistent in sampling rate.

The sampling rate for high resolution edge data is 128 elements in each ring, starting at 20 video lines from the center. The disk 70, whose pixel domains are unaltered, thus contains $$pi*r*r = 400\, pi = 1256 \text{ pixels},$$

where * indicates multiplication.

The number of rings at the periphery is:

$$m = (n/2pi)*(ln(rmax/rmin)) = 51 \text{ rings},$$

where n = 128, rmax = 512, and rmin = 20. The equations for ring number and pixel count may be found in "Exponential Sensor Array Geometry and Simulation", Proceedings of the SPIE Conf. on Pattern Recognition and Signal Processing, Vol. 938, Digital and Optical Shape Representation and Pattern Recognition, Orlando, April (1988) by C. F. R. Weiman.

The number of peripheral resampled pixels is thus m*n = 6528. The total number of resampled pixels is the sum of this number and the foveal pixels, or 7784 pixels. This represents a 32:1 pixel count reduction over a conventional system.

The number of pixels in screens 20 and 24 are calculated by computing the average density of resampled pixels per video line within their boundaries, and multiplying by the areas of the screens. For example, a conservative estimate of the inner and outer boundaries of screen 24 is 250 and 750 video lines from the disk 70. The resampling ring numbers associated with these distances are:

$$m = 51 \text{ as before and}$$

$$m + dm = 73,$$

where $$dm = (n/2pi)*ln(750/250) = 22.$$

The mean is ring number:

$$q = (51 + 73)/2 = 62.$$

The distance from the disk 70 center at this ring number is:

$$r = 20*exp(2*pi*q/n) = 419.$$

The diameter of a resampling cell at this radius is:

$$d = r*2pi/n = 21 \text{ video lines}.$$

Thus, the average resampling cell area is:

$$d*d = 441 \text{ pixels}.$$

The area of screen 24 is:

$$A = 512*480 = 245,760 \text{ pixels},$$

so the number of resampling cells per screen is:

$$A/(d*d) = 557.$$

Doubling this amount for both the screens 20 and 24 yields a sum of 1114 resampling cells for screens 20 and 24. Adding this amount to the resampling cells required for screen 22 cells yields a total (T) of:

$$T = 1,114 + 7,784 = 8,898$$

resampling cells, or only a 14% increase over the resampling cells required for screen 22 where the operator's gaze is directed. The net data compression ratio in pixel count for all three screens over screen 22 video alone is thus approximately a ratio of 28:1. As a result, a conservative compression ratio of 25:1 is achieved.

Edge detection reduces each resampling cell representation to a single bit. Color at 16 bits per sampling cell cancels out against the 16:1 size differential of color versus edge spatial resolution. Thus, 16 bits for each of 8,898 pixels reduces to 2 bits each, an 8-to-1 compression ratio, yielding B=8,898*2=17,796 bits per frame, or B×30=533,880 bits per second for screens 20, 22 and 24 when outputting resampled color and edge data at 30 frames per second.

The discrete cosine transform and DPCM compression technique, described in greater detail below, provides another factor of eight compression so that a 66,735 bits per second net communication rate is achieved. This rate makes available additional bandwidth for error correction coding redundancy or encryption overhead while still maintaining the rate comfortably within 100 kilobits per second. The net compression ratio (C) is thus:

$$C = 25*8*8 = 1600:1.$$

The data transmission rate may be further reduced to 17,800 bits/second by updating imagery at only eight frames per second. Alternatively, at four frames per second, full 16 bit color at 228 elements per ring resolution may be transmitted.

As can be realized from the above an important aspect of image compression made possible by the invention is the provision of an operator display having image cues that closely approach those of the human visual system. This is accomplished through a substantial reduction in the transmission of image data that the operator cannot readily perceive. As employed herein an image cue is considered to be an image feature derived from pixel intensity and/or color data by employing some computation or calculation such as edge detection or opponent color combination detection, such as a red/green contrast. Computation or calculation is intended to include the storage of data in a table for subsequent lookup.

The basic principles of the human visual system which are exploited by the invention include: (a) high central visual resolution and low peripheral visual resolution in a wide field of view; (b) high spatial resolution of the position of sharp contrast edges; (c) low spatial resolution of color; (d) perception of depth from optic flow; and (e) rapid eye motions to points of interest.

The invention exploits these basic principles by (a) resampling video data over the field of view at resolutions which match the perceived peripheral drop in human visual resolution; (b) separating the data into color and edge channels; and (c) applying data compression techniques on the edge and color channel data. The result is 1600:1 compression ratio over raw color video transmission in conjunction with a superior field of view.

Perceptual principles and implementation methods are further described below. There is first described the perceptual distribution of resolution over the human visual field, and the separation of perceptual features into channels.

Contrast edges, which are perceived at high spatial resolution, require minimal parametric data per sample element. Conversely color elements, which require more parametric data per sample element, are perceived at much lower spatial resolution. Communication efficiency is thus gained by separating these two perceptual channels and transmitting data at rates corresponding to perceivable elements.

The visual perception of any local elementary feature, such as a contrast edge or color, is filtered by retinal neural networks through a local receptive field which summarizes the outputs of the collection of contributing photosensors within that field into a single output. The sizes of these receptive fields differ depending on feature type, but for any fixed feature type, receptive fields increase approximately linearly in size from the center of the visual field. The process starts at the outer boundary of the fovea (1 degree in diameter) and proceeds outward. At 90 degrees out, roughly the limit of the field of view, the diameters of receptive fields are more than 100 times larger than in the fovea. Within the fovea itself, receptive fields are uniform in size, providing the highest resolution perception in the visual field.

The peripheral decrease in resolution outside the fovea can be simulated in digital imagery by applying low-pass local filters whose spans are proportional to distance from the center of the visual field.

Contrast edges, the local boundaries between dark and light regions, are known to be the primary cue in human visual perception. Binocular and monocular depth perception, and recognition of patterns is critically dependent on an ability to accurately detect and locate contrast edges in an image.

In regard to logarithmic mapping and reconstruction the radial drop in acuity from the center to the periphery of the human visual field is incorporated into image acquisition techniques that efficiently resample video data, rearranging the desired rotational sampling pattern into a memory array. This mapping is known mathematically as conformal or logarithmic mapping. Details are found in "Exponential Sensor Array Geometry and Simulation" Proceedings of the SPIE Conf. on Pattern Recognition and Signal Processing, Vol. 938, Digital and Optical Shape Representation and Pattern Recognition, Orlando, April 1988 by C. F. R. Weiman and also in "3-D Sensing with Polar Exponential Sensor Arrays", Proceedings of the SPIE Conf. on Pattern Recognition and Signal Processing, Vol. 938, Digital and Optical Shape Representation and Pattern Recognition, Orlando, 1988 by C. F. R. Weiman.

Methods of implementing the logarithmic mapping, and reconstructing imagery which can be usefully perceived by the operator, are described below.

A sampling pattern may be implemented computationally by transforming x-y coordinates of video to log(r)-theta (log polar) coordinates, that is, $$ln(r) = ln(sqrt(x^2+y^2)), \text{ and}$$

$$theta = arctan(y/x).$$

Quantizing r and theta, and summing all x-y data items within each quantum range reduces all data within each receptive field single element. The reduced data is efficiently stored into an array whose rows and columns correspond to the rays and rings of the rotationally symmetric sampling pattern of cells as illustrated in FIG. 5. This mapping is well known mathematically as conformal logarithmic mapping, denoted by LOG(z). Software implementation of logarithmic mapping averages the data within each sampling cell of FIG. 5 and places the result in the (u,v) array. The resolution of the sampling array corresponds to its number of rays, which in turn corresponds to the number of rows in the u-v array. The field of view of the sampling array corresponds to its number of rings, which in turn corresponds to the number of rings in the u-v array. If "n" is the number of rays in the sample space, the number of rings is $$m = [ln(rmax/rmin)*n/(2pi),$$

where rmax and rmin are the inner and outer radii of the sampling pattern.

The central disk 70, which is not mapped, can be made as small as desired. A one pixel diameter, as depicted in FIG. 11c, is the limit for processing, but a perceptually reasonable limit is a diameter which somewhat exceeds the human fovea. That is, since human resolution is uniform within the fovea, nothing is gained by displaying data at higher resolutions. In practice, a diameter of twice the fovea diameter has been found to permit the eye to drift somewhat on the display without losing the perception of uniform resolution.

A presently preferred method for image reconstruction is based on Gaussian Interpolation. This technique is generalized from a method used for 2×2 interpolation of image points in image pyramid expansion, as reported by Peter F. Burt, E. A. Adelson "The LaPlacian Pyramid as a Compact Image Code", IEEE Trans. on Communications. Vol. COM-31, April, 1983, pp. 532-540. An improvement to this technique permits indefinitely large neighborhood sizes without increasing the computation required, as will be shown.

Figure 6A:
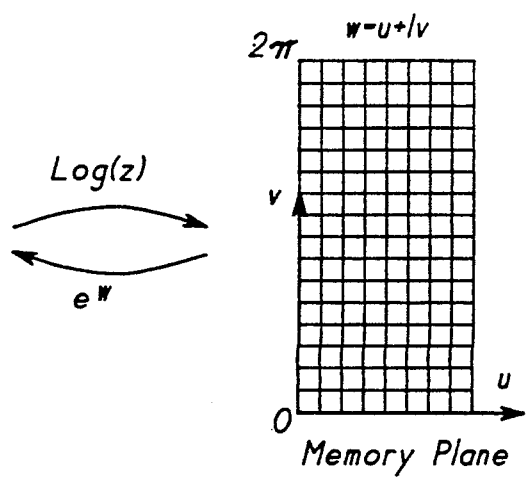
FIGS. 6a and 6b illustrate a display domain and a log domain, respectively.
Figure 6A:
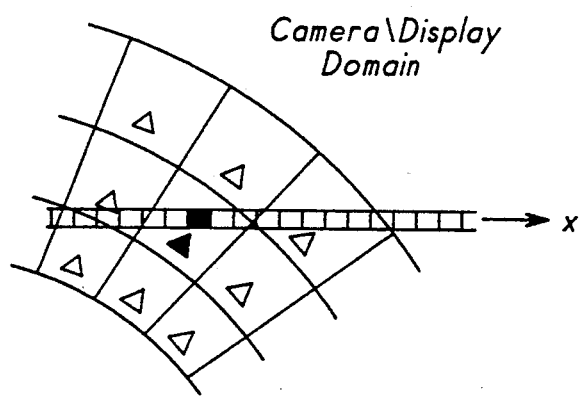
Figure 6B:
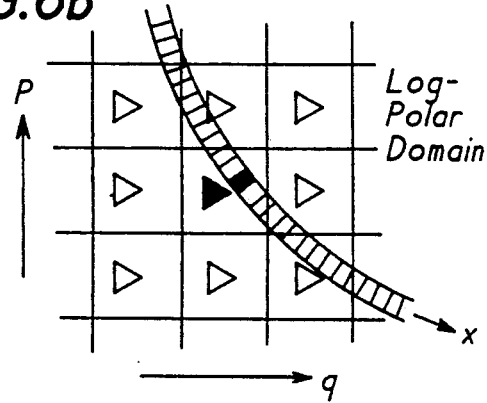

FIGS. 6a and 6b illustrates the geometry of reconstructing display data from logarithmically mapped data. Source data in the log domain (FIG. 6b) consists of samples L in a (q,p) array, represented by small triangles. These are mapped into a display array as shown in FIG. 6a. Display scanline coordinates (x,y) contain more data points (small square) than the source. Thus, source data must be interpolated to generate display data.

A simplest reconstruction method, zeroth order interpolation, replicates L(q,p) for each (x,y) within the image of the domain of the source cell. The result is a number of large tiles of uniform value bordered by step discontinuities. To provide seamless reconstruction, it is necessary to smoothly interpolate data according to its position among the samples of the data point array.

The presently preferred reconstruction method of Gaussian interpolation involves filtering (convolution) sparse source data with a 2-D Gaussian filter whose bandpass closely matches that of the source data. This method performs as well as a bicubic interpolation method but with less computation.

Figure 6C:
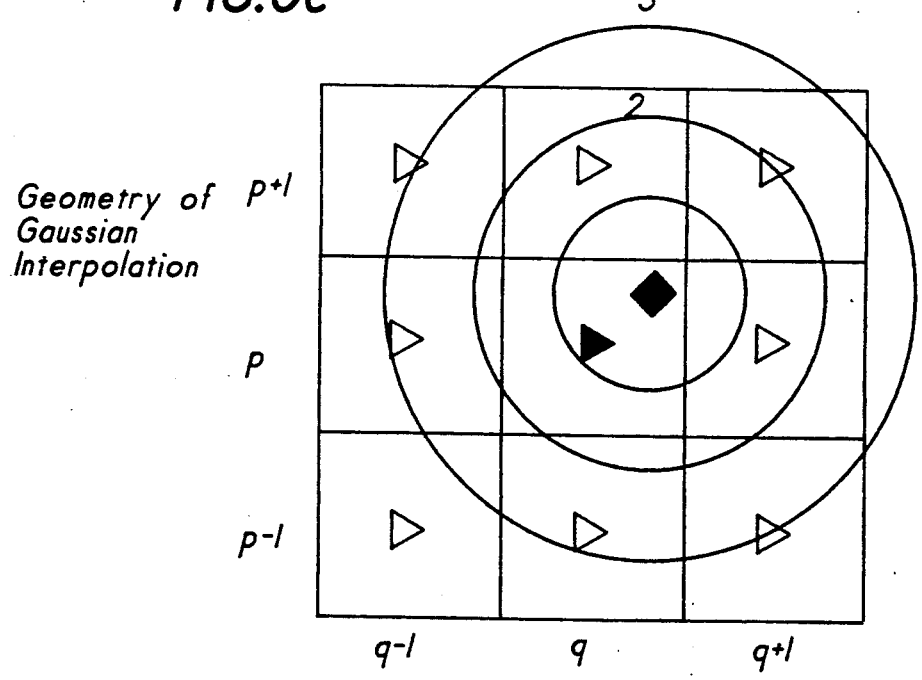
FIG. 6c is an enlarged view of FIG. 6b and illustrates the geometry of Gaussian interpolation, specifically, the generation of a single x-y pixel from the 3×3 nearest neighbors in the logarithmic domain.

FIG. 6c is an enlarged view of FIG. 6b, illustrating the generation of a single x-y pixel from the 3×3 nearest neighbors in the logarithmic domain. The log image of the x-y pixel is indicated by the small solid square. The small triangles represent data points in the Log array, centered in large square cells which represent their domains. The concentric circles centered on the small square represent the one sigma, two sigma and three sigma radii of a 2-D Gaussian function centered on the small square.

Gaussian interpolation is accomplished by summing the Gaussian weighted values of each input pixel in the 3×3 neighborhood of cell (q,p). Weights consist of the volume under the Gaussian surface, partitioned by the (q,p) cell boundaries. In that the 2-D Gaussian is separable, its values are the product of q and p components in FIG. 6c. This relationship advantageously magnitude. That is, $$
\begin{aligned}
g2d(u,v) &= (pi^{**} - 1)*exp(-(u^{}2 + u^{}2)/2) \\
&= (pi^{**} - .5)*exp(-u^{**}2)*(pi^{**} - .5)*exp(-v^{**}2), \\
\text{or} \\
&= g(u)*g(v).
\end{aligned}
$$

It should be realized that other methods besides a lookup table can be employed to determine the Gaussian, such as by directly computing same.

Figure 7:
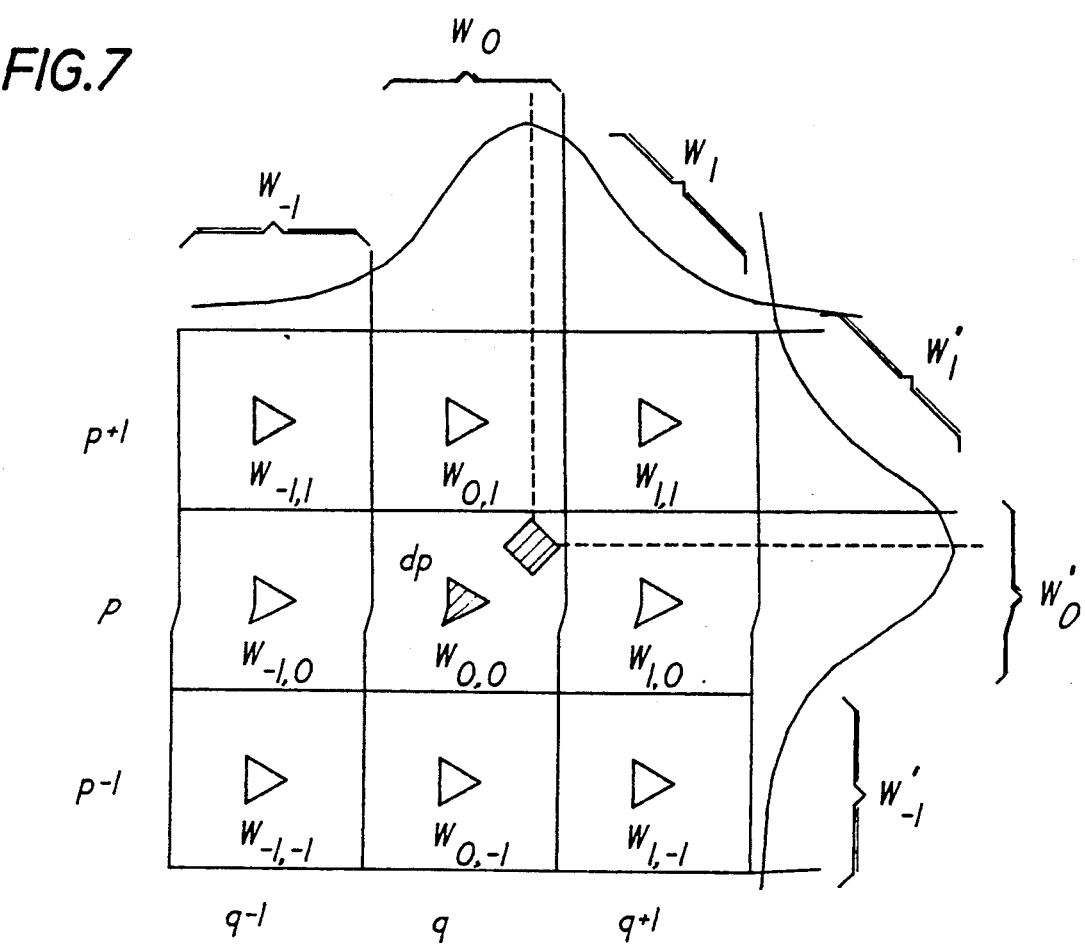
FIG. 7 illustrates the separation of the Gaussian along two axes, specifically the separation of a 2-Dimensional Gaussian into two 1-Dimensional Gaussians.

FIG. 7 illustrates the separation of the Gaussian along two axes. Thus, the weight for each contributing pixel is the product of the weights along two components, i.e., $$W_{ij} = w_i^* w_j'.$$

The offset of the target cell, the cross-hatched square in FIG. 7, within the 3×3 neighborhood of source cells may be represented by subpixel addresses (dq,dp). These fictitious locations are used to offset the lookup into the Gaussian lookup table as described below.

Figure 8A:
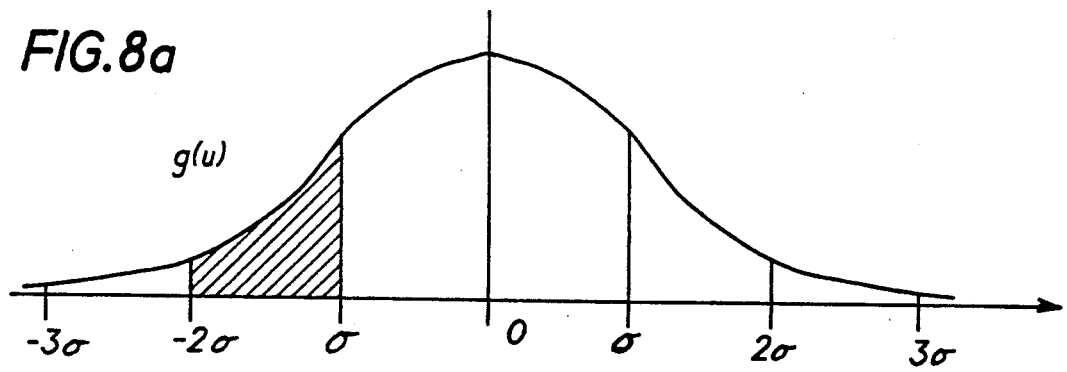
FIG. 8a illustrates a 1-D Gaussian (g(u))
Figure 8B:
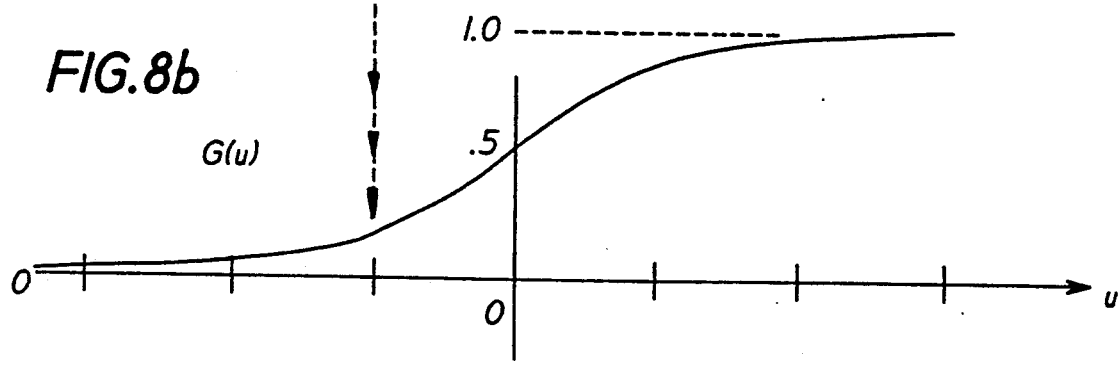

FIG. 8a illustrates the one dimensional Gaussian (g(u)) whereas FIG. 8b illustrates the integral of the one dimensional Gaussian, $$G(u) = \int_{s=-\infty}^{s=u} g(s)ds.$$

The weights shown in FIG. 7, which are areas under the curve over the intervals in question, are computed as follows:

$$
\begin{aligned}
w_{-1} &= G(-1 - 2dq) &= GLT_{-1}(dq); \\
w_0 &= G(1 - 2dq) - G(-1 - 2dq) &= GLT_0(dq); \text{ and} \\
w_{+1} &= 1 - G(1 - 2dq) &= GLT_{+1}(dq).
\end{aligned}
$$

The notation $GLT_i(dq)$ reflects the property that the expressions may be stored as fixed, one parameter lookup tables for efficient computation.

A 3×3 cell neighborhood has been found to be sufficient to encompass all significant contributions to the interpolation based on the scaling of the Gaussian. The scaling choice of ½ pixel per sigma is believed to be optimum to prevent aliasing while maximizing information transfer to the resampled grid. That is, the one sigma cutoff in the frequency domain corresponds to a signal wavelength which is pi/2, or roughly 1.5 times the Nyquist rate of the source grid. Spectral energies at higher frequencies are reduced to below two percent of their original magnitudes by the operation of the Gaussian filter. Slightly tighter sigmas may be used at the risk of introducing aliased high frequency tile boundaries.

Realtime hardware implementation of the foregoing is straightforward. Scanline ordered lookup tables point to the logarithmic mapped data. Subpixel bits correspond to dp and dq which assign Gaussian weights.

The preceding has described presently preferred methods for logarithmically resampling an image, and reconstructing the resulting data. The following describes presently preferred methods for coding and reconstruction of the perceptual content of mapped imagery.

In *Digital Color Image Processing and Psychophysics Within the Framework of a Human Visual Model*, Tech Report UTEC-CSc 77-029 (Ph. D. Thesis) DARPA Contract DAHC15-73-C-0363, Computer Science Dept, University of Utah, June 1976, O. D. Faugeras describes color acuity as a maximum of four cycles per degree R-G and two cycles per degree for yellow-blue contrast. These correspond in the fovea to 15 arc minutes and 30 arc minutes, respectively, or to ratios of 2.5:1 and 5:1 lower, respectively, than contrast edge acuity. Selecting 4:1 as a conservative average color data is mapped by choosing color resampling cells having areas four times as large as edge resampling cells. This results in a 16-fold (4-by-4) reduction in resampling cell count, a significant improvement for bandwidth compression.

Color data compression rates furthermore may be doubled by encoding color according to perceptual spaces, rather than by RGB. That is, by categorizing source pixels into eight basic spectral hues, four levels of saturation, and eight levels of brightness, color resampling cells may thus be characterized by eight bits each instead of 16. These color sample cells are optimally chosen to match chromaticity compartments scaled to human color discrimination resolution. The reconstruction process may then employ Gaussian interpolation with 24 bits of display color, completely eliminating artificial boundaries caused by the relatively low number of color compartments used in the resampling process.

In regard to edge detection and reconstruction it is known that visual contrast edges consist of local regions having large variations in brightness. Edges can be computed using functions which take finite differences of neighboring pixel values. Large magnitudes signify discontinuities or edges. Such difference operations are customarily applied to images by convolving a template of weights with every neighborhood in the image.

Neighborhood weighting operations defining some common edge detectors are the Roberts, Prewitt and Sobel. Most of these operate on small neighborhoods of pixels, usually 3×3. In general, each square is a template of coefficients which multiply pixel contents of the region of the image upon which the template is superimposed. The output is an edge image array derived from the original image array. For example, the output of the Roberts operator for a pixel (x,y) is $$R(x,y) = abs(H_1) + abs(H_2)$$
$$= abs(f(x,y+1) - f(x+1,y)) + abs(f(x+1,y+1) - f(x,y)),$$

where "abs" is the absolute value and f(x,y) is the contents of the (x,y)th pixel. The array R(x,y) will contain large values where the underlying pixels of f(x,y) exhibit local contrast.

Further by example the Sobel operator has components $H_1$ and $H_2$ which are brightness gradients in the x and y directions. The ratio of these is the tangent of the angle of orientation of the underlying edge, and the square root of the sum of the squares is the magnitude of the edge gradient.

Such small span edge detectors often respond spuriously to random noise over small neighborhoods, and fail to detect useful trends in neighborhoods larger than three pixels in diameter. These problems are overcome by large space edge detectors such as that provided by Grossberg. Rather than being square, this template is oval, with positive weights above the center, negative below, and tapered values towards the boundaries. However, one disadvantage associated with this particular detector and related directional edge detectors is that a complete convolution pass over the image data yields edges in only one direction, whereas omnidirectional operators such as Roberts or Sobel detect edges of all orientations in one pass.

Gaussian interpolation provides high quality reconstruction of sparse data at minimal computational cost without aliasing artifacts. Its efficiency derives from display scanline ordered computations over minimal (3×3) neighborhoods. However, it does not reconstruct edges with appropriate visual cues. Its very smoothness, which arises from interpolation of sparse source data into dense display pixels, dulls edges which should be displayed sharply.

Preferably, black and white data is logarithmically mapped and then subjected to Sobel edge detection. The result is inverse mapped using Gaussian interpolation to restore the original image geometry. Edges which are sharp in the log domain are however smeared into "blobs". The cross section of such a blob is a "hump" in an intensity profile as depicted in FIG. 9a.

There are a number of alternatives for sharpening dull edges which result from Gaussian interpolation. The simplest is to threshold the hump as shown in FIG. 9b. One problem with this approach is that peripherally displayed edges, which are wide blobs, come through as very wide stripes, obliterating scene features and giving false cues as regions rather than boundaries.

Another approach to sharpening reconstructed edges is to find the ridgelines of the humps. Mathematical morphology is then employed to thin these features until only a skeleton is left. A drawback is that many iterations are required for the extended humps in the periphery, fatally delaying realtime display.

Alternatively, local maxima may be employed to define ridge lines in three pipelined steps, as illustrated in FIGS. 9a–9d. A gradient operator, such as the Sobel, is applied to the hump, yielding FIG. 9c. The desired output in FIG. 9d results from setting to a value of one those pixels which exceed some threshold T1 in FIG.

9a, provided the corresponding pixel in FIG. 9c is less than some threshold T2.

Optimum results when reconstructing edges are achieved by retaining linear feature data representation of edges rather than treating edges as intensity information. That is, in the log domain edges are represented as short segments of lines or curves, characterized by control points and direction. Reconstruction includes mapping the control points to display space and interpolating thin curves between control points rather than spreading them out with Gaussian interpolation. Since linear feature data is at least an order of magnitude sparser than pixel data, considerable improvement in data compression also results from this approach.

Once color and edge information is distilled from logarithmically mapped images, the resulting data is subjected to a data compression technique as in the third stage 42 of the image compression system 30. Of a number of known methods, including Hybrid Cosine/DPCM, Block Truncation Coding (BTC), quadtree coding, Karhunen-Loeve and other techniques, Hybrid Cosine/DPCM coding is presently preferred in that it yields an 8:1 data compression.

As depicted in FIG. 10 the technique consists of performing a simplified Fourier transform (cosine transform) on a row of 16 pixels, then characterizing the statistical distribution of the resulting coefficients in a column of 16 such rows. The data compression is achieved in that image data is not random row-to-row but is highly correlated. The discrete cosine transform (DCT) functions as a scrambler or hash coder which decorrelates pixel data. The distribution of cosine series coefficients is then compactly characterized in terms of a few statistics such as the mean and standard deviation. These are subsequently scaled and mapped into a more bit-efficient form using Quadrature Amplitude Modulation (QAM).

The next stage collects 16 rows of such blocks and analyzes the statistical distribution of the collection of blocks. The region so summarized represents a window of 16-by-16 pixels in the image. The coherence of the visual world assures redundancy in such contiguous regions. Extended areas of color, texture, or boundary edges maintain trends across many pixels. These trends are reflected in the non-random distribution of DCT coefficient statistics. DPCM coding expresses these trends in compact form.

Reconstruction of original data from compressed data is accomplished by reversing each step of the hybrid technique in reverse order. The fixed block length of this presently preferred method has a number of benefits for computation and transmission. Input computation may be carried out at realtime pixel rates using fixed bit length digital logic units. Processing delay is only that related to the 16 video lines required to construct a block. There is also sufficient data in the 16-by-16 window to exploit image redundancy. No global image content is required for computation. This method applies to grayscale, color components, or binary edge data. Errors in transmission are restricted to a single block, and are generally not correlated frame-to-frame, and will therefore cause very short image disruptions in small areas of the display.

In a further embodiment of the invention the operator 18 is provided control over data transmission rates and image quality. Higher quality images at slower update rates are achieved by transmitting 8-bit per pixel brightness data rather than edge data. However, the display update rate slows from 30 frames per second to five frames per second. In this regard a still further embodiment provides a higher, for example one megabit per second, transmission bandwidth for the operator to call on if needed, preempting other sensor communications from the remote vehicle 10. Display update rate may thus remain at 30 frames per second. If other data transmission requirements are compatible with such occasional priority use for video, this latter technique may be preferable to periodically reducing the video display frame rate.

It should be realized that the system 30 of FIG. 2 can be implemented by discrete hardware blocks, by a digital signal processor (DSP) integrated circuit having a suitable control program, or by a combination of discrete hardware and programmable processing elements. Thus, while the invention has been particularly shown and described with respect to preferred embodiments thereof, it will be understood by those skilled in the art that changes in form and details may be made therein without departing from the scope and spirit of the invention.

What is claimed is:

1. Image processing apparatus comprising:
   data compression means including means for encoding an image represented by digital image data such that the encoded digital image data representation has a centrally disposed region of highest resolution, the resolution continuously and progressively decreasing towards a periphery of the encoded digital image data representation, said data compression means further including means for detecting and locating an edge or edges of an image feature or features in the encoded digital image data representation; and
   data decompression means including means for reconstructing the image for display upon a display means, said reconstructing means reconstructing the image from the encoded digital image data representation such that local components of a corresponding displayed image accurately reflect a position and content of the feature or features of the image, within the limits of the resolution of the display means.

2. Apparatus as set forth in claim 1 wherein the encoding means includes means for encoding the digital image data representation in accordance with a logarithmic polar format.

3. Apparatus as set forth in claim 1 wherein the encoding means includes at leastone camera means having output digital image data encoded in accordance with a logarithmic polar format.

4. Apparatus as set forth in claim 1 and further comprising at least one camera means for generating and outputting the digital image data, and wherein the encoding means includes means coupled to an output of the at least one camera means for converting the digital image data to a logarithmic polar format.

5. Apparatus as set forth in claim 4 wherein the converting means is comprised of a first logarithmic polar logarithmic mapping means for converting black and white image data to a logarithmic polar representation having a first mapping resolution, the converting means further being comprised of a second logarithmic polar mapping means for converting color image data to a logarithmic polar representation having a second mapping resolution that is less than the first mapping resolution.

6. Apparatus as set forth in claim 1 and further comprising means, responsive to a direction of gaze of an observer of the display, for varying a position of the centrally disposed region within the displayed image to coincide with the direction of gaze.

7. Apparatus for providing image data from a first location to a second location, at the first location the apparatus comprising:
    means for generating digital image data expressive of an image having a centrally disposed region of highest resolution, the image resolution continuously and progressively decreasing towards a periphery of the image;
    means, having an input coupled to an output of the generating means, for extracting video image cue data from the video image data; and means, having an input coupled to an output of the extracting means, for compressing the extracted video image cue data.

8. Apparatus as set forth in claim 7 and further comprising means, having an input coupled to an output of the video image data compressing means, for transmitting the compressed video image cue data to the second location.

9. Apparatus as set forth in claim 8 and further comprising at the second location:
    means for receiving the compressed video image cue data transmitted from the first location;
    means for decompressing the received video image cue data;
    means, having an input coupled to an output of the decompressing means, for reconstructing the image from the video image cue data; and
    means for displaying the reconstructed image to an observer.

10. Apparatus as set forth in claim 9 and further comprising means, responsive to a direction of gaze of the observer, for varying a position of the first region within the image to coincide with the direction of gaze.

11. Apparatus as set forth in claim 7 wherein the data compression means includes means for discrete cosine transforming and differentially pulse code modulating the video image cue data.

12. Apparatus as set forth in claim 7 wherein the image generating means includes a plurality of camera means disposed for having overlapping fields of view.

13. Apparatus as set forth in claim 12 wherein the image generating means further includes means, coupled to an output of each of the camera means, for converting a camera scan line output to a logarithmic polar representation thereof.

14. Apparatus as set forth in claim 7 wherein the converting means is comprised of first logarithmic polar mapping means for mapping black and white image data to a logarithmic polar representation having a first mapping resolution, the converting means further being comprised of second logarithmic polar mapping means for mapping color image data to a logarithmic polar representation having a second mapping resolution that is less than the first mapping resolution.

15. Apparatus as set forth in claim 7 wherein the converting means is comprised of first logarithmic polar mapping means for mapping black and white image data to a logarithmic polar representation having a first mapping resolution of 128 radial wedges of pixels, the converting means further being comprised of second logarithmic polar mapping means for mapping color image data to a logarithmic polar representation having a second mapping resolution of 32 radial wedges of pixels.

16. Apparatus as set forth in claim 7 Wherein the extracting means comprises means for processing the video image data for locating high contrast edges.

17. Apparatus as set forth in claim 9 wherein the reconstructing means includes two-dimensional Gaussian filter means.

18. Apparatus as set forth in claim 9 wherein the reconstructing means includes means for performing edge sharpening on extracted image cue data.

19. Apparatus as set forth in claim 9 wherein the displaying means includes means for superimposing extracted image cue data relating to edges and extracted image cue data relating to color.

20. Apparatus as set forth in claim 9 wherein the image generating means includes a plurality of camera means disposed for having abutted fields of view and wherein the displaying means includes a plurality of video display means disposed relative one to another for displaying the abutted fields of view to the observer.

21. Apparatus as set forth in claim 20 and further comprising means, responsive to a direction of gaze of the observer, for varying a position of the first region within the plurality of video display means to coincide with the direction of gaze.

22. Apparatus as set forth in claim 21 wherein the camera means are disposed upon or within a vehicle for viewing an environment of the vehicle and wherein the video display means is disposed at a location remote from the vehicle.

23. Apparatus for providing image data from a remotely controlled vehicle to an operator of the vehicle at a remote location, the apparatus associated with the vehicle comprising:
    means for generating digital image data expressive of an image having a centrally disposed region having a first image resolution surrounded by concentrically disposed peripheral regions of progressively lesser image resolution, the image generating means comprising a plurality of camera means disposed for having abutted fields of view and further comprising means, coupled to an output of each of the camera means, for converting a camera digital image data output to a logarithmic polar representation of the image expressed thereby;
    means, having an input coupled to an output of the generating means, for extracting image cue data from the logarithmic polar representation, the extracting means including means for separating the logarithmic polar representation of the image data into a color channel and into a contrast edge channel, the contrast edge channel having a higher resolution than the color channel;
    means, having an input coupled to an output of the extracting means, for compressing the extracted data; and
    means, having an input coupled to an output of the compressing means, for transmitting the compressed data to the remote location.

24. Apparatus as set forth in claim 23 wherein the data compression means includes means for discrete cosine transforming and differentially pulse code modulating the extracted data.

25. Apparatus as set forth in claim 23 and comprising at the remote location:
    means for receiving the data transmitted from the first location;

means for decompressing the received data;

means, having an input coupled to an output of the decompressing means, for reconstructing the image from the decompressed data, the reconstructing means including Gaussian filter means for performing Gaussian interpolation; and means for displaying the reconstructed image to the operator, the displaying means comprising a plurality of video display means disposed relative one to another for displaying the abutted camera fields of view to the operator.

26. Apparatus as set forth in claim 25 and further comprising means, responsive to a direction of gaze of the operator, for varying a position of the first centrally disposed image region within the plurality of video display means to coincide with the direction of gaze.

27. A method of processing an image, comprising the steps of:

encoding digital image data such that a resolution of a digital image data representation thereof has a centrally disposed region of highest resolution, the image resolution continuously and progressively decreasing towards a periphery of the digital image representation, the step of encoding including a step of locating an edge or edges of an image feature or features in the encoded digital image data representation; and reconstructing the encoded image data for display such that local components of a displayed image representation accurately reflect a position and content of features of the image.

28. A method as set forth in claim 27 wherein the step of encoding includes a step of discrete cosine transforming and differentially pulse code modulating the encoded digital image data representation.

29. A method as set forth in claim 27 wherein the step of reconstructing includes a step of applying a Gaussian filter to the encoded digital image data representation.

30. A method as set forth in claim 27 wherein the step of encoding includes a step of processing the digital image data representation to obtain a logarithmic polar representation of the image.

31. A method as set forth in claim 27 and further comprising a step of, responsive to a direction of gaze of an observer of the displayed image representation, varying a position of the centrally disposed region within the displayed image representation to coincide with the direction of gaze.

32. Image processing apparatus comprising:

means for encoding an image represented by digital image data such that the encoded digital image data representation has a centrally disposed region of highest resolution, the resolution continuously and progressively decreasing towards a periphery of the encoded digital image data representation;

means for reconstructing upon display means a display of the image from the encoded digital image data representation such that local components of the displayed image accurately reflect a position and content of features of the image, within the limits of the resolution of the display means; and at least one camera means for generating and outputting the digital image data, wherein the encoding means includes means coupled to an output of the at least one camera means for converting the digital image data to a logarithmic polar format, and wherein the converting means is comprised of a first logarithmic polar logarithmic mapping means for converting black and white image data to a logarithmic polar representation having a first mapping resolution, the converting means further being comprised of a second logarithmic polar mapping means for converting color image data to a logarithmic polar representation having a second mapping resolution that is less than the first mapping resolution.

33. A method of processing an image, comprising the steps of:

encoding digital image data such that a resolution of a digital image data representation thereof has a centrally disposed region of highest resolution, the image resolution continuously and progressively decreasing towards a periphery of the digital image representation, wherein the step of encoding includes a step of discrete cosine transforming and differentially pulse code modulating the encoded digital image data representation; and reconstructing the encoded image data for display such that local components of a displayed image representation accurately reflect a position and content of features of the image.

34. A method of processing an image, comprising the steps of:

encoding digital image data such that a resolution of a digital image data representation thereof has a centrally disposed region of highest resolution, the image resolution continuously and progressively decreasing towards a periphery of the digital image representation; and reconstructing the encoded image data for display such that local components of a displayed image representation accurately reflect a position and content of features of the image, wherein the step of reconstructing includes a step of applying a Gaussian filter means to the encoded digital image data representation.

* * * * *